UNITED STATES PATENT OFFICE.

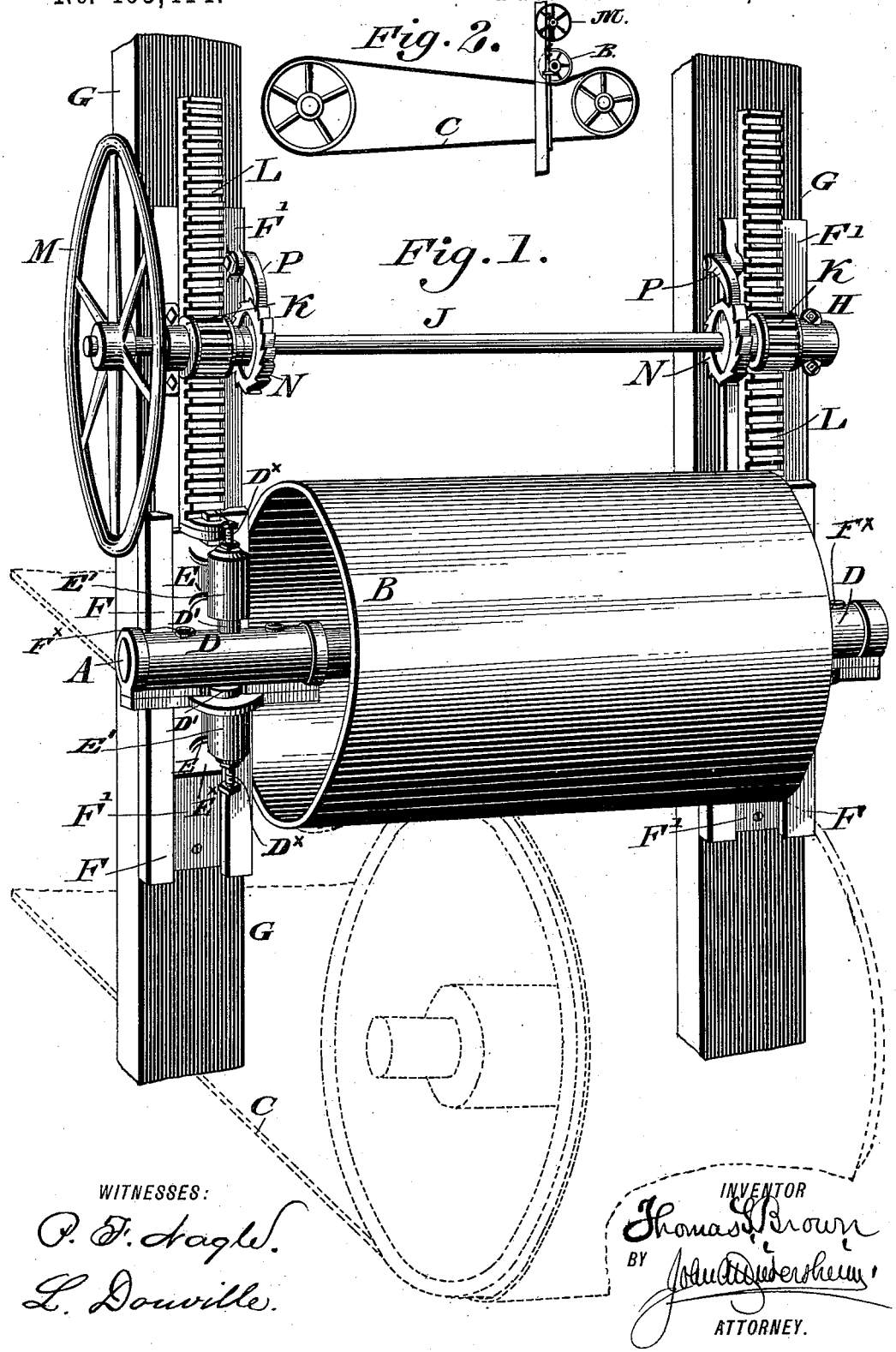

THOMAS S. BROWN, OF PHILADELPHIA, PENNSYLVANIA.

BELT-TIGHTENER.

SPECIFICATION forming part of Letters Patent No. 463,414, dated November 17, 1891.

Application filed November 11, 1890. Serial No. 371,087. (No model.)

*To all whom it may concern:*

Be it known that I, THOMAS S. BROWN, a citizen of the United States, residing in the city and county of Philadelphia, State of Pennsylvania, have invented a new and useful Improvement in Belt-Tighteners, which improvement is fully set forth in the following specification and accompanying drawings.

My invention consists of improvements in a belt-tightener, as will be hereinafter described.

Figure 1 represents a perspective view of a belt-tightener embodying my invention. Fig. 2 represents a side elevation thereof on a reduced scale.

Similar letters of reference indicate corresponding parts in the two figures.

Referring to the drawings, A designates a shaft which carries the drum or pulley B, the latter being adapted to bear against the belt C for tightening the same. The said shaft is journaled in bearings D, which are held between plugs D', vertically movable in sockets E', the latter being connected with brackets E. Screws $D^\times$ are fitted in the opposite ends of said sockets, so as to clamp said plugs against and hold the bearings in place. The brackets E are connected with slides $E^\times$, which are adapted to move in the dovetail or other ways or guides F on the back plates F', which are fastened to the supports or uprights G.

Suitably journaled in the bearings H, on the back or attaching plates F' and above the shaft A, is a rotatable shaft J, having secured thereon the pinions K, which engage with and are thereby adapted to raise or lower the racks L, attached to the slides $E^\times$ of the brackets E. To the shaft J are also secured the operating hand-wheel M and the ratchets N, with which latter engage the pawls P on the back plates F', so as to prevent improper rotation of said shaft. It will be seen that by rotating the wheel M in one direction, the pawls being thrown out, the shaft J, with its pinions K, is operated, so that the racks L are lowered, thereby lowering the bearings D, and consequently the shaft A and drum or pulley B. Consequently pulley B is brought into engagement with the outer surface of the belt, which is thus depressed, taking up the slack and causing the belt to hug or come in contact with more of the belt surface of the receiving-pulley, thus preventing the slipping of the belt. It will be seen that if from any cause the drum does not set true nor contact uniformly with the belt it can be corrected or adjusted by raising or lowering either side by means of the screws $D^\times$, the effect of which is evident. In order to remove the pressure on the belt the motion of the hand-wheel is reversed, so as to raise the pulley B, the effect of which is evident. To each bearing D is secured a lubricator $F^\times$ for the journals of the shaft A.

The device may be applied directly to the receiving-pulley where practicable, and also to chain-wheels for the tightening of the chains on conveyers, elevators, &c., and it may also be located below the belt or chain, so as to operate on the lower run thereof.

Having thus described my invention, what I claim as new, and desire to secure by Letters Patent, is—

1. A belt-tightener comprising the back plates having ways and bearings thereon, an operating-shaft in said bearings, slides movable in said ways and carrying adjustable bearings for a shaft, a drum on said shaft, and mechanism connected with said operating-shaft and slides for moving the latter with their attached parts, said parts being combined substantially as described.

2. A belt-tightener comprising the attaching-plates having guideways, bearings for a shaft and parts thereon, an operating-shaft in said bearings, having pinions and ratchets thereon and means for rotating the same, slides movable in said ways, racks connected with said slides and meshing with said pinions, sockets on said slides, a drum having its shaft journaled in bearings, and adjustable plugs in the sockets contacting with said bearings, said parts being combined substantially as described.

3. In a belt-tightener, the attaching-plates having ways and bearings for a shaft thereon, a shaft journaled in said bearings, pinions with ratchets on said shaft, pawls on said plates, slides movable in said ways, racks on said slides, a drum mounted on said slides, 5 brackets secured to said slides, having sockets thereon, plugs movable in said sockets, and bearings held between said plugs, in combination with lubricators connected with said bearings, substantially as described.

THOS. S. BROWN.

Witnesses:
CHAS. E. PANCOAST,
JOHN R. FOREMAN.